United States Patent [19]

Mori

[11] Patent Number: 4,955,975
[45] Date of Patent: Sep. 11, 1990

[54] RAINBOW FORMING DEVICE

[76] Inventor: Kei Mori, 3-16-3-501, Kaminoge, Setagaya, Tokyo, Japan

[21] Appl. No.: 384,356

[22] Filed: Jul. 24, 1989

[30] Foreign Application Priority Data

Sep. 26, 1988 [JP] Japan .................. 63-239954
Mar. 29, 1989 [JP] Japan .................. 1-77343

[51] Int. Cl.$^5$ .................................. G02B 6/34
[52] U.S. Cl. .................. 350/96.19; 350/96.10; 350/96.18; 350/96.24; 362/32; 362/339
[58] Field of Search ............. 350/96.10, 96.15, 96.18, 350/96.19, 96.24; 250/227; 362/326, 339, 32

[56] References Cited

U.S. PATENT DOCUMENTS

| 1,981,999 | 8/1932 | French | 350/96.19 X |
| 4,214,297 | 7/1980 | Kühn et al. | 362/339 X |
| 4,223,216 | 9/1980 | Quick et al. | 250/227 X |
| 4,389,085 | 6/1983 | Mori | 350/96.18 X |
| 4,411,490 | 10/1983 | Daniel | 350/96.24 X |
| 4,557,055 | 12/1985 | Arai | 353/81 |
| 4,681,402 | 7/1987 | Tiffany | 350/286 |
| 4,798,444 | 1/1989 | McLean | 350/96.24 |
| 4,849,866 | 7/1989 | Mori | 362/327 |

Primary Examiner—John D. Lee
Attorney, Agent, or Firm—Jordan and Hamburg

[57] ABSTRACT

A rainbow forming device includes a light guide for transmitting visible light therethrough and a prism having a cross-section of a substantially equilateral triangle for splitting the light into a series of colors of the spectrum to form a rainbow. A light-emitting end of the light guide is set with its axis perpendicular to the prism's first edge. The visible light emitted from the light guide's end passes through the prism along the path from prism's first vertex including the prism's first edge to said prism's second vertex and the light split into colors of the spectrum are emitted from the prism's third vertex and forms a rainbow.

18 Claims, 5 Drawing Sheets

RAINBOW FORMING DEVICE

BACKGROUND OF THE INVENTION

The present invention relates to a rainbow forming device and more particularly to a device for forming an artificial rainbow for decorative purposes at any desired place for example in inner space of a building or a place where a fountain and/or trees have been placed.

Recently, many buildings have been designed with a lounge area that has a fountain and plants or trees. Particularly, in a hotel or the like such facilities are installed in a lobby or in a garden so as to create a pleasant atmosphere. However, such facilities are limited in their design and are usually similar to each other. Unusual designs are scarcely found which attract public attention.

In view of the foregoing, the applicant has previously proposed a rainbow-forming device which can create a rainbow artificially in a space such as in the lobby of a hotel or building in order to produce a certain atmosphere.

A rainbow-forming device previously proposed by the present applicant is such that sunlight or artificial white light made up of visible-spectral components is focused through a lens system and introduced into a light guide whereby the visible light (or the white light) is transmitted therethrough and emitted therefrom to go into a lens placed in opposition to a light-emitting end of the light guide, and the light is formed into a parallel light beam which enters into a set of prisms and is split into the colors of the spectrum and emitted therefrom to form a rainbow in a desired space. Practically, the device comprises a number of light guides aligned with each other for transmitting sunlight or artificial white light made up of visible-spectral components focused through a lens, a slender cylindrical lens is placed opposite to the aligned light-emitting ends of the light guides and a number of slender prisms are aligned with each other opposite the slender cylindrical lens. The parallel light beam, having passed through the cylindrical lens, enters into the prisms wherein it is split into a series of color components ranging from red (R) having long wavelengths to blue (B) with short wavelengths. An intermediate portion is made up of colors of the light components refracted in accordance with their wavelengths. Thus is formed a rainbow containing a series of colors arranged from upper red to lower blue in the order of their wavelengths.

Another example of a rainbow-forming device previously proposed by the present applicant comprises a single light guide and correspondingly a single round lens and a set of prisms arranged in a circle. It is also possible to use a single prism of a circular configuration instead of a set of prisms. Such a design of the rainbow-forming device makes it easier to arrange together a fiber optic cable, a lens and a prism and also to obtain an interesting rainbow of an almost circular form. However, the above-mentioned rainbow-forming device is rather large and is expensive since the light rays emitted from the light guide do not enter into the prism directly but through the round lens for obtaining a parallel light beam.

SUMMARY OF THE INVENTION

A primary object of the present invention is to provide a rainbow-forming device capable of creating a rainbow through a single prism without using a round lens.

Another object of the present invention is to provide a rainbow-forming device wherein a light-receiving end of a light guide is set at a focal point of a lens so as to selectively receive only the visible-spectral components of the sun's rays or artificial light rays.

Another object of the present invention is to provide a rainbow-forming device wherein a plurality of light guides are arranged to emit therefrom light rays toward a first edge of a prism.

Another object of the present invention is to provide a rainbow-forming device wherein a plurality of light guides are bundled together to form a single cable having a light-emitting end directed toward a first edge of a prism so as to create a very bright rainbow.

Further object of the present invention is to provide a rainbow-forming device wherein a number of light guides or cables are aligned with each other within a given distance from the prism in order to create a very bright rainbow.

DESCRIPTION OF THE PREFERRED EMBODIMENTS

Figure 1:
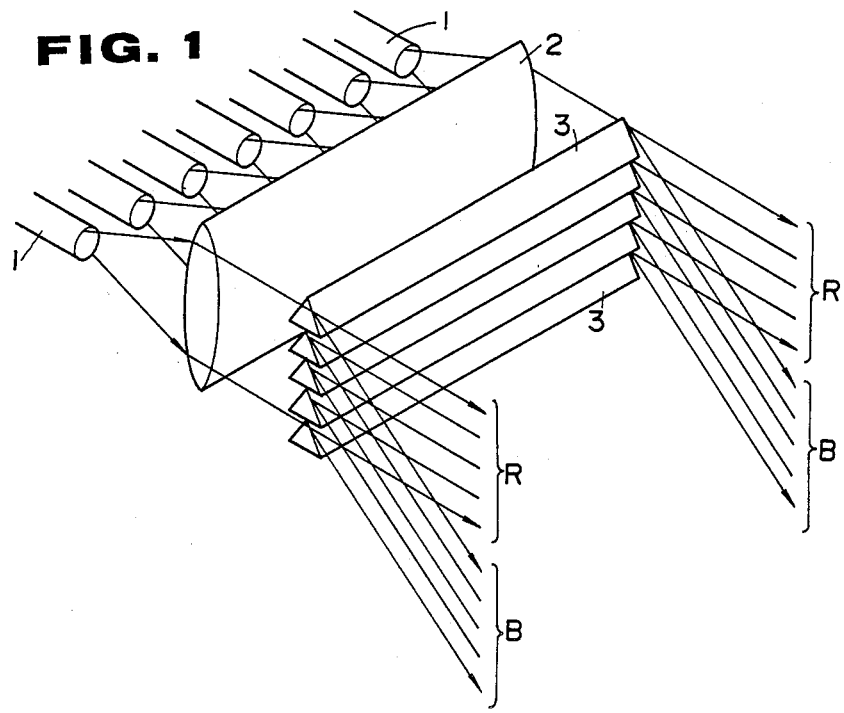
FIGS. 1 and 2 are views for explaining respectively rainbow-forming devices previously proposed by the present applicant.

FIG. 1 is a construction view for explaining a rainbow-forming device previously proposed by the present applicant. In FIG. 1, 1 is a light guide for transmitting sunlight or artificial visible (white) light made up of light spectral components focused through a lens, 2 is a lens facing the light-emitting end of said light guide so as to translate the light from the light-emitting end of the light guide into a parallel beam of light, 3 is a set of slender prisms for receiving the parallel light beam and for splitting the same into the colors of the spectrum. The device shown in FIG. 1 comprises a number of light guides 1 aligned with each other, a slender cylindrical lens 2 facing the aligned light guides 1 and a number of slender prisms 3 aligned with each other opposite to the slender cylindrical lens 2. In FIG. 1, a number of prisms are used, but a single prism may be sufficient. Each light guide 1 is a fiber optic cable which consists of a number of optical fibers and is flexible. As mentioned above, the parallel light beam, having passed through the cylindrical lens 2, enters into the prisms wherein it is split into a series of color components ranging from red (R) having a long wavelength to blue (B) with a short wavelength. An intermediate portion is made up of the colors of the light components refracted in accordance with their wavelengths. Thus formed rainbows, containing a series of colors arranged in order from upper red to lower blue in the order of their wavelengths, may be very beautiful because a plurality of rainbows is seen as being overlapped depending upon their distance from the prism.

Figure 2:
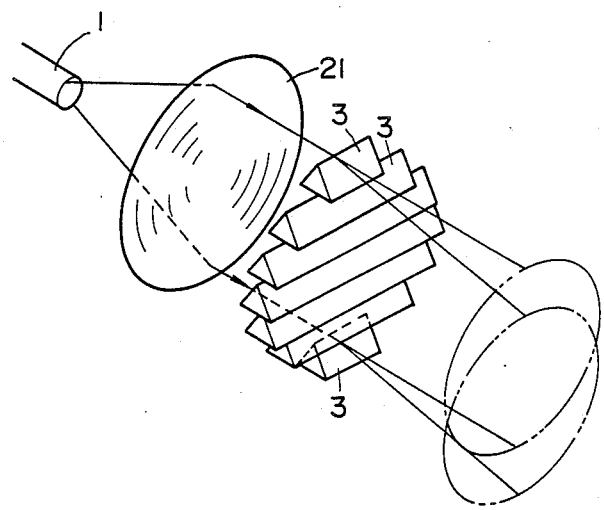

FIG. 2 is a construction view showing another example of a rainbow forming device as previously proposed by the present applicant. With reference to FIG. 2, in which parts similar to those previously described with reference to FIG. 1, are denoted by the same reference numerals, a rainbow forming device comprises a fiber optic cable 1 adopted as a light source, a single round lens 21 and a set of prisms 3 arranged in a circle. It is also possible to use a single prism of a circular configuration instead of a set of prisms. Such a design of the rainbow-forming device makes it easier to arrange a fiber optic cable 1, a lens 21 and a prism 3 and also to obtain an interesting rainbow of an almost circular form. However, the above-mentioned rainbow-forming device is of a rather large size and is expensive since light rays emitted from the fiber optic cable do not enter into the prism 3 directly but through a cylindrical or round lens for obtaining a parallel light beam.

In view of the foregoing, the present invention was made in order to provide a rainbow forming device which can create a rainbow through a single prism without using a cylindrical or round lens.

Figure 3:
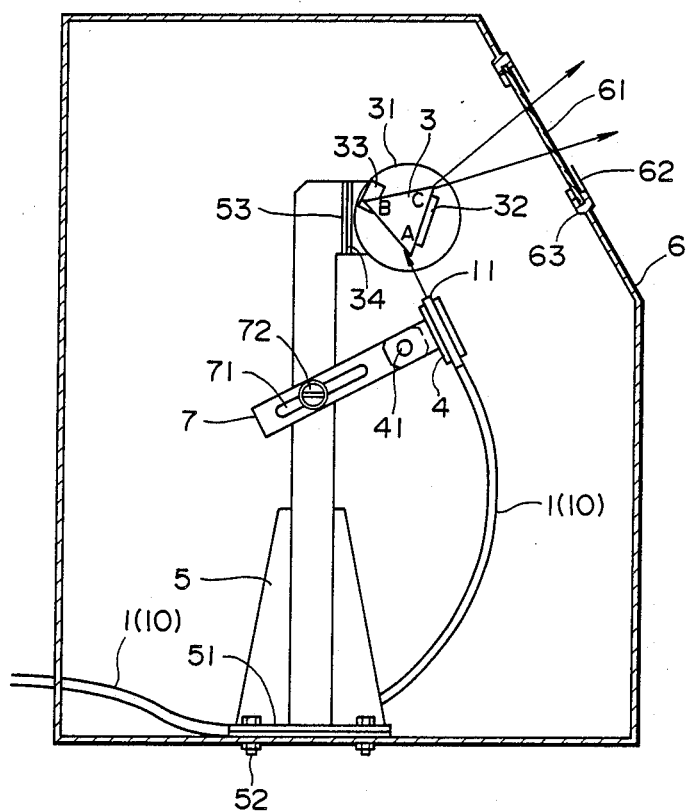
FIG. 3 is a side view of a main portion of a rainbow-forming device embodied in the present invention.

FIG. 3 is a view showing the construction of a rainbow-forming device embodied in the present invention.

Figure 4:
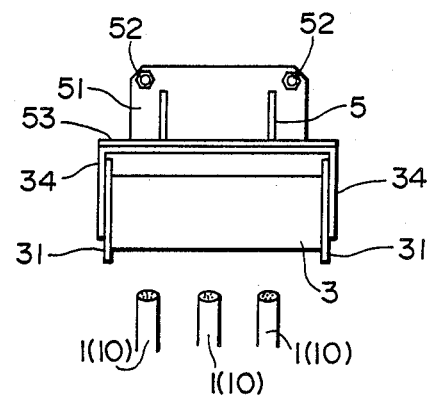
FIG. 4 is a plane view of a prism mounted on the device.

FIG. 4 is a plane view of a prism-holding portion in FIG. 3. In FIGS. 3 and 4, 1 is a fiber optic cable and 3 is a prism. Visible light from a light source, not shown in FIG. 3, is transmitted through the fiber optic cable 1 and discharged from the light-emitting end 11 thereof. Said light-emitting end 11 is supported by a holder 4 which is movably and rotatably secured to a stand 5 by means of a supporting plate 7. Namely, said supporting plate 7 being of a rectangular form has a longitudinal open slot 71 therein to allow for the sliding and turning of the plate itself together with the holder 4 relative to the stand and in order to set the light-emitting end 11 of the fiber optic cable in a given position. The supporting plate 7 is secured to the stand 5 by using a set screw 72 located in the slot 71 of the supporting plate 7. A clamp 41 rotatably secures the holder 4 to the supporting plate 7 in order to adjust the position of the cable's light-emitting end. As shown in FIGS. 3 and 4, the prism 3 formed as an almost equilateral triangle in its cross-section is supported by supporting members in such a way that both end-faces of the prism are clamped by the side plates 31 and the second vertex B and the edge surface facing the second vertex B are supported respectively by supporting plates 33 and 32 connected to the side plates 31. The side plates 31 are secured to a set plate 34 which in turn is secured to a set plate 53 of the stand 5. The relationship between the prism 3 and the light-emitting end 11 of the fiber optic cable 1 is such that an optical axis of the light-emitting end 11 is fixed to perpendicularly intersect the first edge of the first vertex A of the prism 3 and is directed toward the prism's second vertex B. A base plate 51 of the stand 5 is secured with screws 52 to a housing 6 wherein the whole stand is mounted. A portion of the housing 6, which faces a third vertex C of the prism 3, has an inclined surface wherein a transparent plate 61 is fitted in a holding frame 63 of the housing and secured with a setting frame 62. In such a relative position of the light-emitting end 11 and the prism 3, it has been confirmed by the present applicant that visible light transmitted through the light guide 1 is emitted from the light emitting end 11 of said light guide 1 in a direction along the line from the first vertex A to the second vertex B of the prism 3 and the visible light having entered into the prism 3 is split into a series of spectral colors which are emitted from the third vertex C of the prism 3 to form a rainbow consisting of spectral colors ranging from the upper red zone to the lower blue zone. Thus a rainbow appears out of the housing through the transparent plate 61.

Figure 5A:
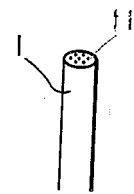
FIG. 5 (a) and (b) are views illustrating light guides and a fiber optic cable used in an embodiment of the present invention.
Figure 5B:
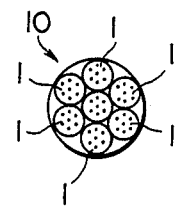

FIG. 5 is a view showing a light guide used in the embodiment of the present invention. In FIG. 5(a), 1 is a single light guide having a light-receiving end 11 set at a focal position of a lens in such a way that only the visible light components of the sun's rays or artificial light rays can be introduced into said light guide as described below. Said light guide 1 contains a number of optical fibers and is usually called a fiber optic cable. In FIG. 5(b), there is shown an example of cabling which is made up of a plurality of light guides (as for instance 7 light guides) shown in FIG. 5(a). In this case the light guides 1 having their light-receiving ends separately placed at the focal positions of corresponding lenses are bundled together to form one cable 10 having a light-emitting end 11 directed toward a prism 3. Such a cabling makes it possible to create a brighter and more impressive rainbow. By using said cable it is also possible to create a rainbow similar to that formed by using a single light guide. A single light guide 1 or cable 10 may be applied effectively also. Moreover, when a plurality of light guides 1 or cables 10 are used at a given space from each other, a more impressive rainbow may be obtained.

Figure 6:
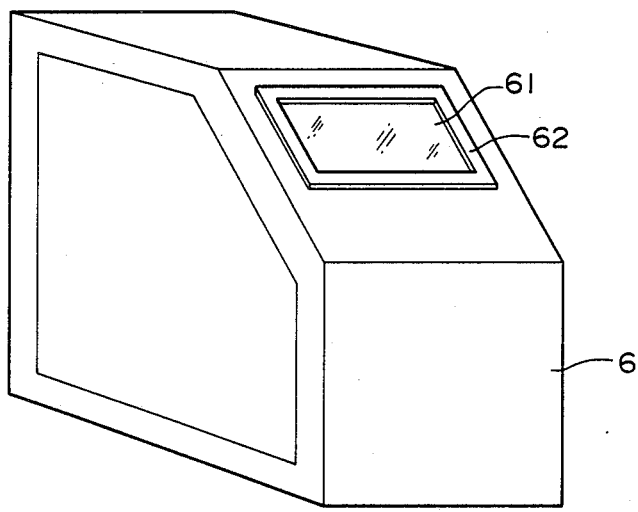
FIG. 6 is an external view of a rainbow-forming device, according to the present invention.

FIG. 6 is a view illustrating the appearance of the rainbow-forming device of FIG. 3. As mentioned above, the light is split into a series of colors of the spectrum through a prism 3 and projected through a transparent window 61 of the device. A rainbow can be seen at any desired place such as, for example, on the wall of a building.

As is apparent from the foregoing description, according to the present invention, it is possible to provide a rainbow-forming device which is low in cost and simple in construction not requiring a round lens applied in the prior art. Furthermore, the present device may be fabricated so compact that it becomes portable and therefore allows for a wider application. It is also possible to use a cable made up of a bundle of light guides (fiber optic cables) capable of emitting stronger light beams to create a brighter rainbow.

Figure 7:
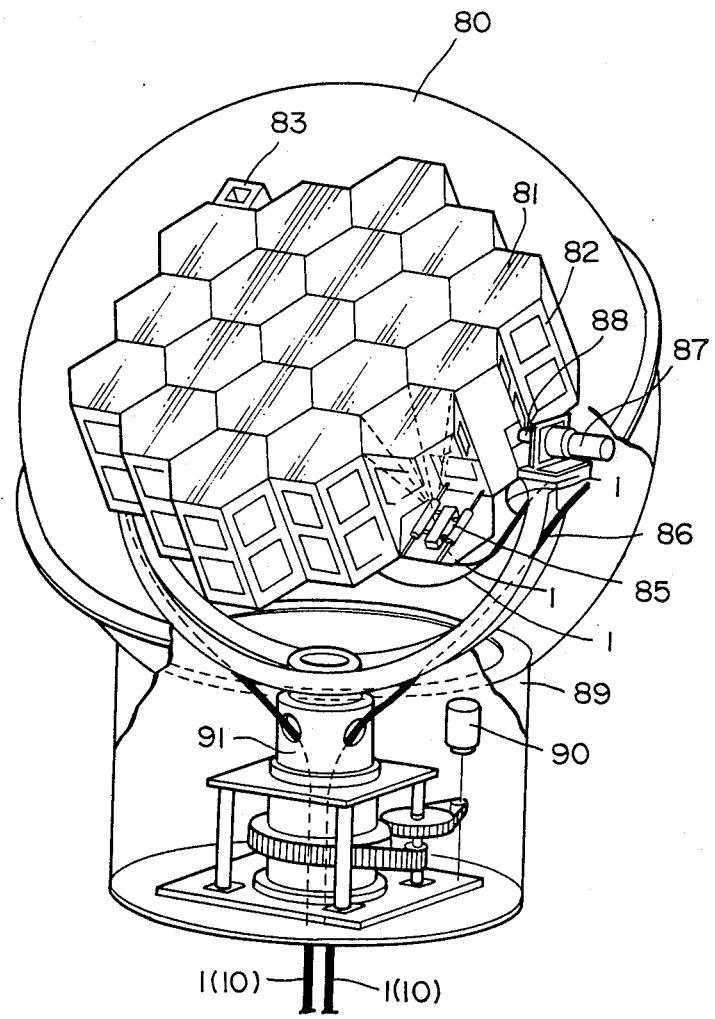
FIG. 7 is a view showing an embodiment of a solar ray collecting device used in the present invention.

FIG. 7 is a construction view for illustrating, by way of example, a solar ray collecting device for guiding the sunlight into the aforesaid fiber optic cable. In FIG. 7, numeral 80 is a transparent capsule, 81 is a Fresnel lens, 82 is a lens holder, 83 is a solar position sensor, 1 is a light guide or a fiber optic cable consisting of a large number of optical fibers with light-receiving end surfaces set on the focal plane of the Fresnel lens system, 85 is a holder of optical fibers, 86 is an arm, 87 is a pulse motor, 88 is a horizontal rotary shaft to be driven by the pulse motor 87, 89 is a base for supporting the protective capsule 80, 90 is a pulse motor and 91 is a vertical rotary shaft to be driven by the pulse motor 90.

The direction of the sun is detected by means of a solar position sensor 83 and its detection signal controls the pulse motors 87 and 90 of the horizontal and vertical rotation shafts 78 and 81 respectively so as to always direct the solar position sensor toward the sun, and the sunlight focused by the lens 81 is guided into the light guide 1 through its end-surface set at the focal point of the lens. All of the light guides 1, separately placed at each lens, are bundled together in a fiber optic cable 10, the free end of which is led to any place where light radiation is needed for the afore-mentioned purposes.

Figure 8:
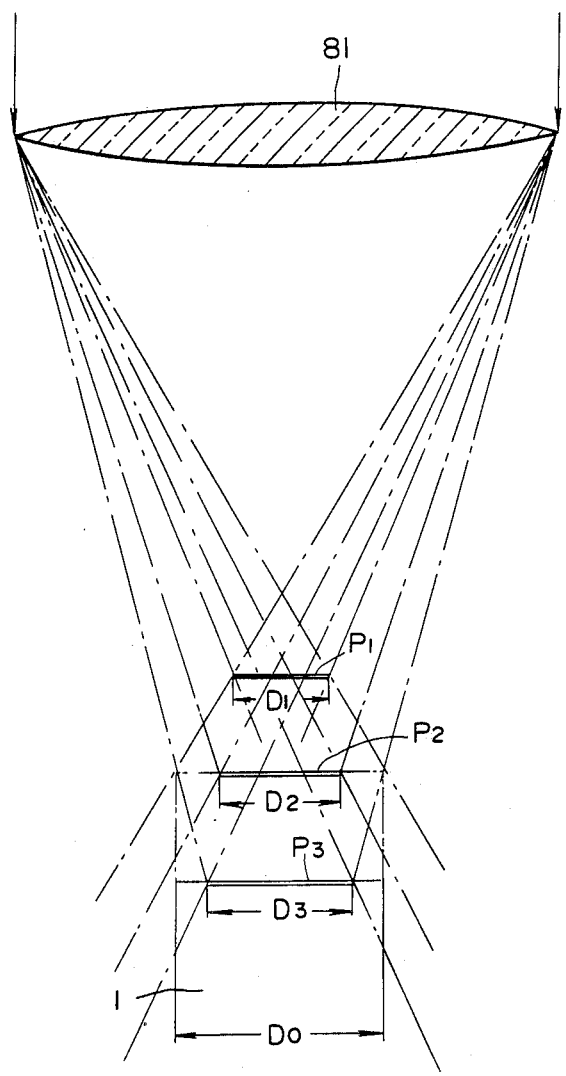
FIG. 8 is a view for explaining how to introduce visible-spectral solar rays into a light guide through a lens system of the solar ray collecting device.

FIG. 8 is a view for explaining how to guide the solar rays collected by the above-mentioned lens 31 into the light guides. In FIG. 8, 81 is a Fresnel lens or the like and 1 is a light guide which receives the sunlight focused by the lens 81 and which transmits the same to any desired place. In the case of focusing the sunlight through the lens system, the solar image has a central portion, consisting of almost white light and a circumferential portion containing therein a large amount of light components having wave-lengths corresponding to the focal point of the lens system. Namely, in the case of focusing sunlight through the lens system, the focal point and the size of the solar image will vary in accordance with the component wave-lengths of the light. For instance, the blue color light having a short wave-length makes a solar image of diameter D1 at position P1. Furthermore, the green color light makes a solar image of diameter D2 at position P2 and the red color light makes a solar image of diameter D3 at position P3. Consequently, as shown in FIG. 8, when the light-receiving end-surfaces of the light guides are set at position P1, it is possible to collect the sunlight containing plenty of the blue color components at the circumferential portion thereof. When the light-receiving end-surfaces of the light guides are set at position P2, it is possible to collect the sunlight containing plenty of the green color components at the circumferential portion thereof. When the light-receiving end-surfaces of the light guides are set at position P3 it is possible to collect the sunlight containing plenty of red color components at the circumferential portion thereof. In each case, the diameter of the light guide 1 can be selected in accordance with the light components to be collected. For instance, the required diameters of the fiber optic cables are D1, D2 and D3, respectively, depending on the colors of the light rays to be stressed, i.e. the blue, green and red colors. In such a way, the required amount of the light guides can be saved and thereby the sunlight containing therein plenty of desired color components can be collected most effectively.

And further, as shown in FIG. 8, if the diameter of the light-receiving end-surface of the light guide is enlarged to D0, it may be possible to collect visible light containing therein all of its wavelength components. The light guides 1 may be pre-set at the focal point of the lens system in the manufacturing process or they may be left in an adjustable condition in the axial direction of the lens system to allow the user to adjust and fix said light guides depending upon the desired color of the light to be obtained. By selecting the wave-length of the light components to be introduced into the fiber optic cable, it becomes possible to use the light radiating system more effectively for various purposes. The above-mentioned example relates to the device for introducing the solar rays into the fiber optic cable. However, it is also possible to introduce artificial light into the fiber optic cable.

I claim:

1. A rainbow forming device comprising an elongated light guide means having a longitudinal end portion terminating at a light-emitting end, said longitudinal end portion having a longitudinal axis, an elongated prism having a cross-section in the form of a substantially equilateral triangle, said prism having first, second and third vertexes at each of first, second and third edges, respectively, support means supporting said longitudinal end portion of said light guide means such that said longitudinal end portion of said light guide means is juxtaposed to said first prism edge and said longitudinal axis of said longitudinal end portion of said light guide means is substantially perpendicular to said first prism edge, said light-emitting end of said light guide means emitting visible light rays to said prism to pass through said prism along a path from said first vertex to said second vertex and the light rays are split into colors of the spectrum which are emitted from said third vertex to form an artificial rainbow.

2. A rainbow forming device according to claim 1, wherein said support means supports said longitudinal end portion of said light guide means and also supports said prism, said support means comprising adjustable means for adjusting the position of said longitudinal end portion of said light guide means relative to said prism.

3. A rainbow forming device according to claim 2, wherein said support means comprises an upright stand, said adjustable means comprising a first mounting means adjustably mounted on said stand, said first mounting means supporting said longitudinal end portion of said light guide means.

4. A rainbow forming device according to claim 3, wherein said first mounting means comprises a first member slidably and rotatably mounted on said stand and a second member rotatably mounted on said first member, said second member mounting said longitudinal end portion of said light guide means.

5. A rainbow forming device according to claim 3 further comprising second mounting means on said stand supporting said prism.

6. A rainbow forming device according to claim 5, wherein said second mounting means mounts said prism on said stand in a fixed position generally overlying said light-emitting end of said light guide means.

7. A rainbow forming device according to claim 5, wherein said prism has longitudinal ends, said second mounting means having two side plates which engage said longitudinal ends of said prism, said second mounting means further comprising a structure means structurally connecting said two side plates to said stand.

8. A rainbow forming device according to claim 7, wherein said second mounting means further comprises a first connecting member connected between said two side plates and a second connecting member connected between said two side plates, said first connecting member engaging and supporting said second vertex, said prism having a prism face opposite said second vertex, said second connecting member engaging and supporting said prism face.

9. A rainbow forming device according to claim 1, further comprising an enclosure housing disposed about said prism, said support means, and said longitudinal end portion of said light guide means.

10. A rainbow forming device according to claim 9, wherein said housing has a transparent member, said light rays emitted from said third vertex passing through said transparent member.

11. A rainbow forming device according to claim 10, wherein said transparent member is a flat transparent member.

12. A rainbow forming device according to claim 11, wherein said prism is operable to emit light rays split into colors of the spectrum through said transparent member onto a surface to form an artificial rainbow on said surface.

13. A rainbow forming device according to claim 9, wherein said support means comprises a stand having a base, said housing having a bottom, and fastening means fastening said base to said bottom of said housing.

14. A rainbow forming device according to claim 1, wherein said light guide means comprises a plurality of optical fiber elements bundled together to form an optical cable.

15. A rainbow forming device according to claim 1, further comprising solar ray collecting means for collecting solar rays, said solar ray collecting means having a plurality of solar ray collecting lenses, said light guide means comprising an optical cable comprises of a plurality of fiber optical elements, each of said fiber optical elements having a light-receiving end separately disposed at the focal point of one of said plurality of lenses so as to receive visible spectral components of said solar rays.

16. An artificial rainbow forming device comprising an enclosure housing, an upright stand in said housing, a first and second mounting means on said upright stand, an elongated light guide means extending into said housing and having a longitudinal end portion terminating at a light emitting end, said longitudinal end portion of said light guide means having a longitudinal axis, said first mounting means mounting said longitudinal end portion of said light guide means on said upright stand such that the position of said longitudinal end portion of said light guide means is adjustable relative to said upright stand, an elongated prism disposed in said housing, said second mounting means mounting said prism on said upright stand, said elongated prism having a cross section in the form of a substantially equilateral triangle, said prism having first, second and third vertexes at each of first, second and third edges, said first mounting means mounting said longitudinal end portion of said light guide means such that said longitudinal end portion of said light guide means is juxtaposed to said first prism edge and said longitudinal axis of said longitudinal end portion of said light guide means is substantially perpendicular to said first prism edge, said light-emitting end of said light guide means emitting visible light rays to said prism to pass through said prism along a path from said first prism vertex to said second prism vertex and the light rays are split into colors of the spectrum which are emitted from said third prism vertex, a cover means on said housing, said cover means having a transparent part, said light rays emitted from said third prism vertex passing through said transparent part to form an artificial rainbow externally of said housing.

17. An artificial rainbow forming device according to claim 16, wherein said prism has longitudinal ends, said second mounting means having two side plates which engage said longitudinal ends of said prism and a structure structurally connecting said side plates to said upright stand, said second mounting means further comprising a first connecting member connected between said two side plates and a second connecting member connected between said two side plates, said first connecting member engaging and supporting said second vertex, said prism having a prism face opposite said second vertex, said second connecting member engaging and supporting said prism face.

18. An artificial rainbow forming device according to claim 16, wherein said transparent part is a flat transparent member.

* * * * *